(12) United States Patent
Simister

(10) Patent No.: US 8,806,347 B2
(45) Date of Patent: Aug. 12, 2014

(54) SYSTEMS AND METHODS FOR PROVIDING DISTRIBUTED USER INTERFACES TO CONFIGURE CLIENT DEVICES

(75) Inventor: James L. Simister, Pleasant Grove, UT (US)

(73) Assignee: Panasonic Corporation, Osaka (JP)

( * ) Notice: Subject to any disclaimer, the term of this patent is extended or adjusted under 35 U.S.C. 154(b) by 687 days.

(21) Appl. No.: 11/320,554

(22) Filed: Dec. 27, 2005

(65) Prior Publication Data

US 2007/0150554 A1    Jun. 28, 2007

(51) Int. Cl.
*G06F 17/00* (2006.01)

(52) U.S. Cl.
USPC ............ 715/744; 715/735; 715/740; 715/719

(58) Field of Classification Search
CPC ............................... G06F 13/10; G06F 3/0481
USPC ................. 715/744, 735, 740, 719; 709/219
See application file for complete search history.

(56) References Cited

U.S. PATENT DOCUMENTS

| | | | | |
|---|---|---|---|---|
| 6,020,881 | A * | 2/2000 | Naughton et al. | 715/740 |
| 6,259,707 | B1 * | 7/2001 | Dara-Abrams et al. | 370/486 |
| 6,297,746 | B1 * | 10/2001 | Nakazawa et al. | 340/825.69 |
| 6,779,004 | B1 * | 8/2004 | Zintel | 709/227 |
| 6,801,507 | B1 | 10/2004 | Humpleman et al. | |
| 6,912,429 | B1 * | 6/2005 | Bilger | 700/19 |
| 6,918,123 | B1 * | 7/2005 | Shteyn | 719/318 |
| 7,012,607 | B1 | 3/2006 | Kurlander et al. | |
| 7,013,297 | B2 | 3/2006 | Miksovsky | |
| 7,047,092 | B2 * | 5/2006 | Wimsatt | 700/83 |
| 7,240,323 | B1 * | 7/2007 | Desai et al. | 717/100 |
| 2001/0041982 | A1 * | 11/2001 | Kawasaki et al. | 704/275 |
| 2002/0003548 | A1 * | 1/2002 | Krusche et al. | 345/736 |
| 2002/0027569 | A1 * | 3/2002 | Manni et al. | 345/764 |
| 2003/0009537 | A1 * | 1/2003 | Wang | 709/219 |
| 2003/0200340 | A1 * | 10/2003 | Hutter | 709/250 |
| 2004/0183756 | A1 * | 9/2004 | Freitas et al. | 345/73 |
| 2005/0149501 | A1 | 7/2005 | Barrett | |

FOREIGN PATENT DOCUMENTS

WO       WO 0137581 A2 *  5/2001
WO       01/69380         9/2001

OTHER PUBLICATIONS

Toufic Boubez; Frank Sommers; Michael Abbott; Alan Moffet; Robert Flenner; Bilal Siddiqui; Frank Cohen; Rajam Ramamurti; Navaneeth Krishnan, Java P2P Unleashed, Sep. 12, 2002, pp. 370-373.*

* cited by examiner

*Primary Examiner* — Doug Hutton, Jr.
*Assistant Examiner* — Brian Garmon
(74) *Attorney, Agent, or Firm* — Austin Rapp & Hardman

(57) ABSTRACT

A client device having at least one user configurable setting is detected by a user interface device. The user interface device and the client device are in electronic communication with each other. Setting signals identifying user configurable settings of the client device are received at the user interface device. A user interface, based on the setting signals, is formulated at the user interface device. Configuration of the user interface is controlled by the user interface device rather than the client device. User input may be received at the user interface device in view of the user interface. In response to receipt of this input, a control signal is transmitted to the client device to alter at least one user configurable setting of the client device. The user interface device may thus be utilized to view and alter configuration settings for one or more client devices.

22 Claims, 10 Drawing Sheets

SYSTEMS AND METHODS FOR PROVIDING DISTRIBUTED USER INTERFACES TO CONFIGURE CLIENT DEVICES

TECHNICAL FIELD

The present invention relates generally to computers and computer-related technology. More specifically, the present invention relates to distributed user interfaces for the setup and configuration of client devices.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional, complete computer system. For example, these small computers may be a one-chip computer, such as a microcontroller; a one-board type of computer, such as a controller; or a typical desktop computer, such as an IBM-PC compatible, etc.

Computers typically have one or more processors at the heart of the computer. The processor(s) are usually interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

Embedded systems may be utilized in a wide variety of different scenarios. For example, lighting systems may utilize embedded technology. In particular, an embedded system may be used to monitor and control a lighting system. For example, an embedded system could be used to dim or increase the brightness of an individual light or a set of lights within a lighting system. An embedded system may be used to create a specific lighting pattern by activating individual lights within the lighting system. Embedded systems may be coupled to individual switches within the lighting system. An embedded system may instruct the switches to power up or power down individual lights or the entire lighting system. The brightness or power state of each individual light may thus be controlled by the embedded system.

Security systems may likewise utilize embedded technology. An embedded system may be used to control and monitor the individual security sensors within a security system. An embedded system may provide controls to power up each of the security sensors automatically at a specific time of day or night. An embedded system may be coupled to a motion sensor. An embedded system may power up the individual motion sensor automatically and provide controls to activate a video camera and/or an alarm, if motion is detected. Embedded systems may also be coupled to sensors monitoring a door or a window and take specified action when activity is sensed.

Embedded technology may also be used to control wireless products, such as cell phones. An embedded system may provide instructions to power up the display of the cell phone. An embedded system may also activate the audio speakers within the cell phone to provide the user with an audio notification of an incoming call.

Home appliances, such as stoves, refrigerators, or microwave ovens, may also incorporate embedded technology. For example, a massage recliner may incorporate an embedded system to provide instructions to automatically recline the back portion of the chair according to the preferences of the user. An embedded system may also provide instructions to initiate the oscillating components within the chair according to the preferences of the user.

Additional products typically found in homes may also incorporate embedded systems. For example, an embedded system may be used within a toilet to control the level of water used to refill the water supply tank. Embedded systems may be used within a jetted bathtub to, for example, control the outflow of air.

Although many of these embedded devices often include user configurable settings, they frequently lack an easy, intuitive user interface for altering the settings. For example, a high-end home audio amplifier may have many options for reconfiguring input and output signals, balancing of speaker acoustics, and various processing options. Using the buttons (or combinations of buttons) on the front panel of the device and buttons on the remote control is typically the only way to access the settings. Altering the settings using front panel controls and a remote control is often cumbersome, time-consuming, and not intuitive. As a result, many useful features of these devices are not utilized by average consumers.

Further, many embedded devices (e.g., portable music players) are getting smaller and smaller, further decreasing the possibility of providing an intuitive, easy-to-use interface directly on the device itself. The functionality of these devices is also increasing further accentuating the need for superior and intuitive ways to alter settings within these devices.

Accordingly, benefits may be realized by improved systems and methods for configuring client devices. Some exemplary systems and methods for providing distributed user interfaces for configuring client devices are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
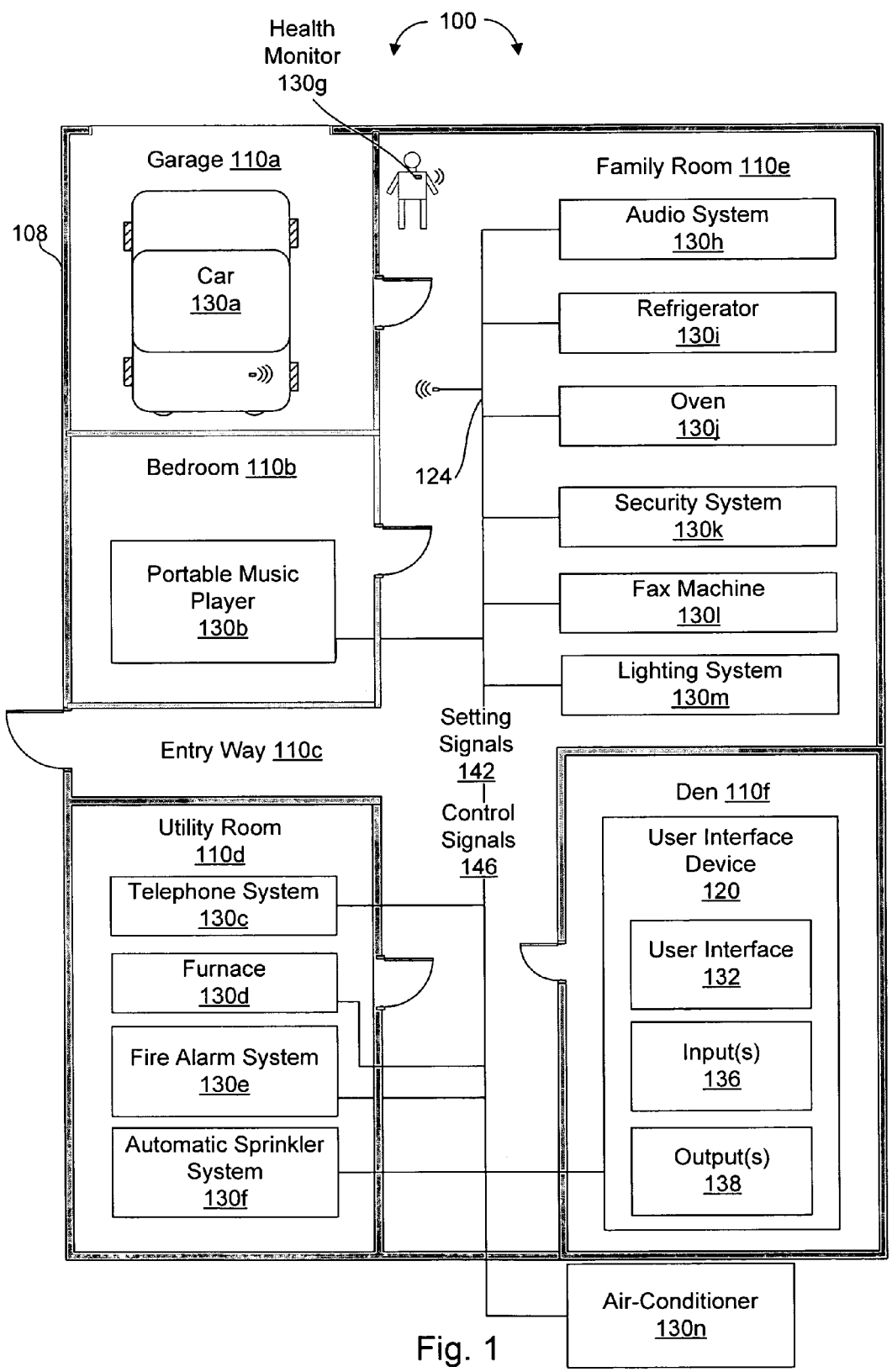
FIG. 1 is a block diagram of one embodiment of a distributed user interface system shown within an embodiment of a home.

A method for providing a distributed user interface for configuration of a client device is disclosed. From a user interface device, a client device having at least one user configurable setting is detected. At the user interface device, setting signals identifying the user configurable setting of the client device and permissible parameters for the setting are received. At the user interface device, a user interface, based on the received setting signals is formulated, wherein configuration of the user interface is controlled by the user interface device rather than the client device.

In one embodiment, the setting signals are devoid of any data identifying a particular configuration of the user interface. The setting signals may further identify current settings of the client device.

In one embodiment, the disclosed method may further comprise transmitting a notification from the client device to the user interface device and/or displaying the formulated user interface on a display device.

The disclosed method may also include: receiving input signals corresponding to user input at the user interface device to alter the user configurable setting; formulating a control signal at the user interface device based on the received input signals; and transmitting the control signal from the user interface device to the client device.

In one embodiment, the method may further include: detecting from the user interface device a second client device having at least one user configurable setting; and receiving, at the user interface device, setting signals from the second client device.

In one embodiment, the client device and/or user interface devices are embedded devices. The setting signals may include metadata, which describes the data and/or settings received.

A computer system configured to implement the methods described above is also disclosed. The system includes a user interface device and one or more client devices. The user interface device includes a processor and memory in electronic communication with each other. At least one of the client devices includes at least one user configurable setting. The user interface device and client device(s) are in electronic communication with each other. Instructions stored in the memory of the user interface device are configured to implement the methods described above. A computer-readable medium comprising executable instructions for implementing the methods described above is also disclosed. The disclosed systems and methods may be utilized with one or any number of client devices.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the term "computing device" refers to any type of electronic device having a processor, which typically performs arithmetic or logical operations. The computing device may include memory (e.g., random access memory (RAM)), flash memory, and/or a hard disk storage device). The computing device may process instructions stored in memory. A computing device may optionally include other components, such as communication interfaces (e.g., a network card or modem) for communicating with other devices, inputs for receiving user input (e.g., a keyboard, touchpad, or mouse) or outputs (e.g., audio outputs or a display screen) for providing information to a user. Additionally, it should be noted that a computing device may be embodied as different types of devices, such as a desktop computer, server, tablet PC, notebook computer, personal data assistant (PDA), cellular phone, or embedded device.

FIG. 1 is a block diagram of one embodiment of a distributed user interface system 100 shown within a home 108. The depicted home 108 includes a garage 100a housing a car 130a, a bedroom 110b, an entryway 110c, a utility room 110d, a family room 110e, and a den 110f. The diagram of FIG. 1 depicts the first floor of the home 108. For simplicity, the second or other floors are not shown.

The home 108 illustrated in FIG. 1 is, of course, only exemplary. The distributed user interface system 100 may be utilized in various environments, such as an office building, an apartment complex, a neighborhood, or a city.

The illustrated system 100 includes a user interface device 120, a user interface 132, a network 124, and a series of client devices 130a-n. The user interface device 120 is a computing device used to formulate a user interface 132 for the configuration and set up of client devices 130. The user interface device 120 includes various input(s) 136 and output(s) 138. The inputs 136 may comprise, for example, a keypad, keyboard, mouse, microphone, remote control device, button, joystick, trackball, touchpad, touch screen, lightpen, etc. Examples of different kinds of output devices 138 include a display screen (such as an LCD or CRT display screen) and an audio speaker. In one embodiment, the inputs 136 and outputs 138 are integrated with the user interface device 120 and, in alternative embodiment, the inputs 136 and or outputs 138 are physically separate from the user interface device 120. Accordingly, the user interface device 120 may be embodied in various ways, such as an embedded device, laptop computer, desktop computer system, cellular phone, personal data assistance (PDA), a wall-mounted or wireless touch-screen, a tablet PC, a television monitor combined with a remote-control and/or wireless keyboard for input and a computing device (either integrated or physically discrete from the television monitor). Each of these devices may include programming code for performing the functions of a user interface device 120.

The user interface 132 formulated by the user interface device 120 may be embodied in various ways. For example, the user interface 132 may comprise programming code or electronic signals (digital or analog signals) for displaying a graphical user interface on a display screen (e.g., a television monitor) and receiving input via a keyboard, mouse, or remote-control device. The user interface 132, in an alternative embodiment may comprise programming code for receiving and processing voice commands via a microphone, with or without a graphical user, interface.

The network 124 is a communication channel through which data signals may be transmitted between, for example, the user interface device 120 and client devices 130. The network 124 may be embodied in various ways. For example, the network 124 may include local area networks (LANs), storage area networks (SANs), metropolitan area networks (MANs), wide area networks (WANs), or combinations thereof (e.g., the Internet) with no requirement that the user interface device 120 and client devices 130 reside at the same physical location, within the same network 124 segment, or even within the same network 124. A variety of different network 124 configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, wireless networks (e.g., 802.11g or a wireless telephone/data network), proprietary formulas, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network." The network 124 may also comprise, in one embodiment, an embedded device network produced by Matsushita Electric Works, Ltd. of Osaka, Japan. An embedded device network comprises distributed networks of requestors, providers, and intervening nodes that allow rapid re-routing of communication channels when network failures occur.

Of course, a user interface device 120 and a client device 130 do not necessarily communicate via a network 124. For example, a universal serial bus (USB), a standard serial port, parallel port, or wireless Bluetooth connection may be utilized for communication between a user interface device 120 and a client device 130.

The client devices 130 may be embodied in a wide variety of different configurations. A client device 130 is any device with user configurable settings. Exemplary types of client devices 130 include a car 130a, portable music player 130b, telephone system 130c, furnace 130d, fire alarm system 130e, automatic sprinkler system 130f, portable personal health monitor 130g, audio system 130h, refrigerator 130i, oven 130j, security system 130k, fax machine 130l, lighting system 130m, and air conditioner 130n.

In the depicted embodiment, setting signals 142, which identify user configurable settings of client devices 130 and permissible parameters for those settings, are transmitted via the network 124 to the user interface device 120. The setting signals 142, in one embodiment, may also identify current settings of a pertinent client device 130. The setting signals 142 are received at the user interface device 120. The user interface device 120 then formulates a user interface 132. The configuration of the user interface 132 is controlled by the user interface device 120 rather than the client device 130. In one embodiment, the setting signals 142 are devoid of any data identifying a particular configuration of a user interface 132. Of course, the name and type (including the size) of the data may be provided without identifying a particular configuration of a user interface 132.

The configuration of the user interface 132 may be embodied in a number of different ways. For example, in one embodiment, the user interface device 120 may create programming code for receiving voice commands or a graphical user interface for displaying possible settings of a client device 130 and/or for receiving related user input from one of the inputs 136. The user interface device 120 may determine whether to, for example, create graphical representations of check boxes, drop down menus, data entry boxes, point-and-click buttons, nested menus, slide controllers, or dials on a display screen to provide an intuitive user interface system for controlling settings of a particular client device 130 or set of devices 130. Furthermore, configuration of the user interface 132 may involve programming code for presentation of a visual and audible user interface (using, for example, text-to-speech technology) in a specific language, such as English, French, or Spanish, according to the settings of the user interface device 120.

Thereafter, user input may be received via an input 136 to alter one of the user configurable settings in view of the user interface 132 provided. Thereafter, a control signal 146 is transmitted to the pertinent client device 130 to alter the user configurable setting. A control signal 146 could, for example, be transmitted to dictate whether a ringer of the telephone system 136*c* is set to an audible or a silent mode. The telephone system 130*c* could also, for example, be set to send all incoming calls directly to voicemail. A portable health monitor 130*g* could, in one embodiment, be configured to provide warnings when a monitored person's heart rate exceeds or falls below a specified level. Control signals 146 could be utilized to control user configurable settings within a car 130*a*, such as a car stereo or a fuel injection system within the car 130*a*. Control signals may be transmitted via a wireless or wired network 124 to modify the settings of a portable music player 130*b*.

In one embodiment, the client devices 130 may utilize a consistent language and/or protocols for transmitting setting signals 142 to the user interface device 120. In an alternative embodiment, the user interface device 120 may receive and process setting signals 142 that utilize various formats and protocols.

The disclosed system 100 provides substantial advantages over prior art devices. In the present state of the art, client devices may have a wide variety of user configurable settings. Unfortunately, creating a user interface that is large enough to handle complex settings may be too expensive to make the product marketable and/or may unreasonably increase the size of the device. Furthermore, creating multiple user interfaces for different devices is wasteful. For example, a portable music player 130*b* with a 17-inch large screen would be unmarketable due to cost and size constraints. Furthermore, because of the complexity of adjusting the settings in many devices, users are frequently not even aware of many of the capabilities of the devices they own or use everyday or adjustment of those settings is too time-consuming or complex. Creating a single user interface device 120, as disclosed herein, that can interact with multiple devices 130 allows the client devices 130 to be both smaller and less expensive while retaining an ease of use for configuration of the device. The user interface device 120 may additionally provide a consistent interface that enables the user to easily interact with the client devices 130 and utilize the full capabilities of the devices 130.

The embodiment illustrated in FIG. 1 is merely illustrative. The disclosed user interface device 120 may be embodied in various ways. Furthermore, the client devices 130 shown are merely illustrative. Any type of device that includes user configurable settings could be designed as a client device 130 such that it may interact with the user interface device 120.

Figure 2A:
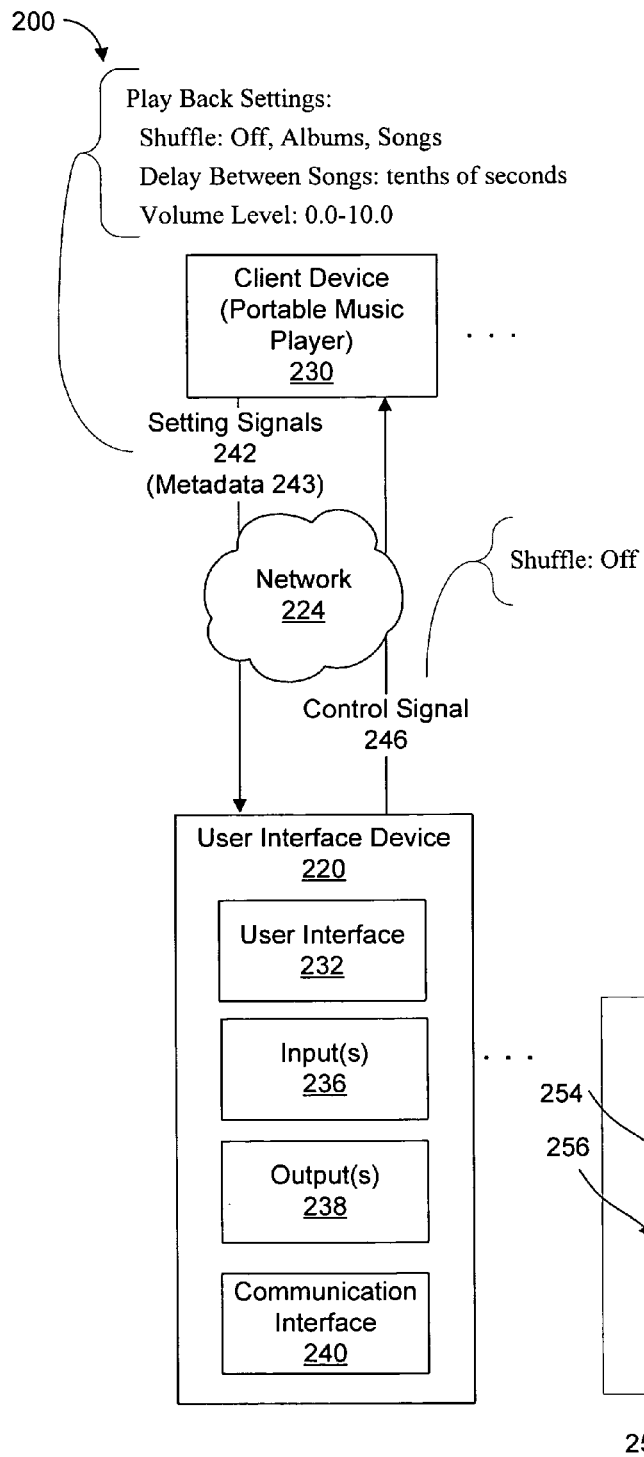
FIG. 2A is a block diagram illustrating one embodiment of a distributed user interface system including a single client device and a single user interface device.
Figure 2B:
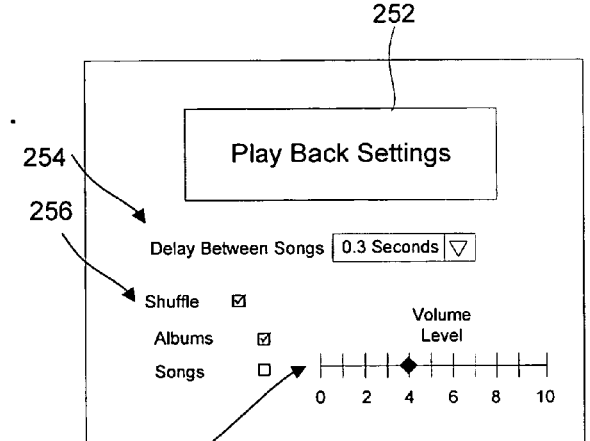
FIG. 2B is a screenshot of one embodiment of a user interface generated utilizing the distributed user interface system illustrated in FIG. 2A.

FIG. 2A is a block diagram illustrating one embodiment of a distributed user interface system 200 including a user interface device 220 and a client device 230. In FIG. 2A, the client device 230 is a portable music player, which may communicate with the user interface utilizing a wireless or a wired network 224. FIG. 2B is an illustrative screenshot 250 to adjust settings for the client device depicted in FIG. 2A.

As indicated previously, the user interface device 220 is utilized to generate a user interface 232 and may include inputs 236 and outputs 238. As shown in FIG. 2A, the user interface device may also include a communication interface component 240 that enables the device 220 to communicate with one or more client devices through the network 224 or electronic other communication channel.

The client device 230 depicted in FIG. 2A is a portable music player. As explained in connection with FIG. 1, setting signals 242 are transmitted from the client device to a user interface device 220. The setting signals 242 identify user configurable settings of client devices 130 and permissible parameters for those settings. In the illustrated embodiment, the setting signals 242 could include signals that indicate the following data, which corresponds to the screenshot shown in FIG. 2A:

Play Back Settings:
        Shuffle: Off, Albums, Songs
        Delay Between Songs: tenths of seconds
        Volume Level: 0.0-10.0

As indicated above, in one embodiment, the setting signals 242 did not describe or specify a configuration of the user interface 232. Instead, a configuration of user interface 232 is determined by the user interface device 220.

In this illustration, based on the setting signals 242, a visual representation of the user interface is shown in the screenshot 250 of FIG. 2B. As illustrated in FIG. 2B, the playback settings data has been displayed in a heading format 252. A drop-down menu 254 has been utilized to represent the "Delay Between Songs" settings. Check boxes 256 have been utilized to allow user control of the shuffle settings. A slide control 258 allows a user to control the volume level. In this embodiment, the user interface device 220 controls the configuration of the user interface, i.e., utilizing a drop-down menu 254, check boxes 256, and a slide control 258.

In response to user input, for example, adjusting the volume level using the slide control 258, a control signal 246 may be transmitted to the client device. For example, a control signal 246 may be transmitted having data representing the change in the shuffle settings as follows:

Shuffle: Off

In response thereto, the client device 230 changes the shuffle setting of the portable music player to "Off".

The embodiment shown in FIG. 2 is merely exemplary. As indicated previously, a particular system 200 may include many different types of user interface devices 220 and/or client devices 230. As will be explained below, multiple user interface devices 220 may be utilized to control a single client device 230 or a set of client devices 230.

Also, the setting signals 242, in one configuration, may include other types of information, such as potential or recommended user interface configurations. The information may optionally include metadata 243, i.e., data that describes data and/or settings. The metadata 243 may describe the data provided in a way such that the user interface device 220 can better determine how to present the settings. For example, the metadata 243 could include information recommending that a volume control be presented as a dial or that a thermostat control be presented a slider. Other potential recommended user interfaces could include drop-down boxes, checkboxes, string input fields, dials, sliders, lights, radio buttons, etc. The metadata 243 could also provide context such as a range for the data and/or units of measure.

Figure 3:
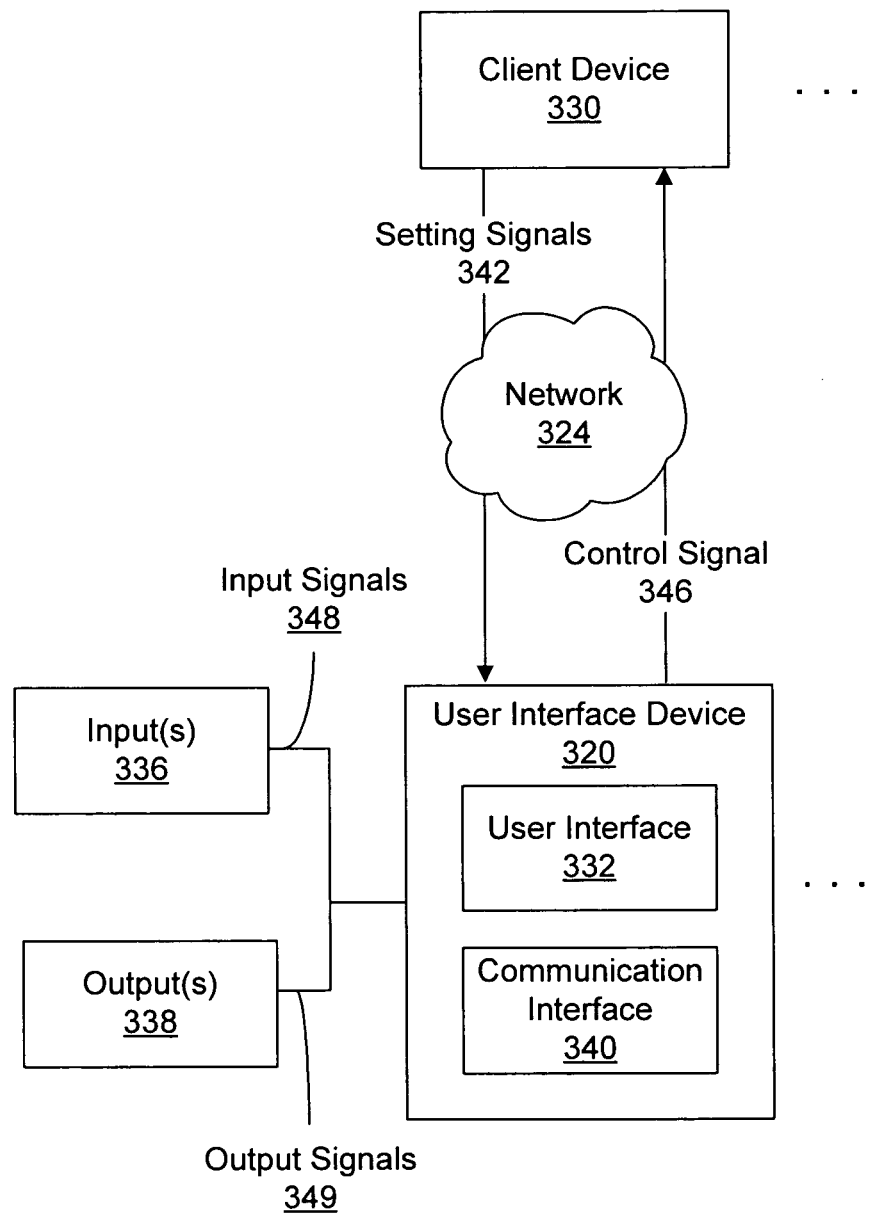
FIG. 3 is a block diagram of an alternative embodiment of a distributed user interface system shown with external input and output devices.

FIG. 3 illustrates an alternative embodiment of a distributed user interface system 300. This system 300 is similar to the system 200 shown in FIG. 2. Accordingly, a user interface device 320, network 324, and a client device 330 are included in the system 300. Setting signals 342 may be transmitted from the client device 330 to the user interface device 320. Based on the setting signals 342, a user interface 332 is formulated. In response to user input, control settings 346 may be transmitted from the user interface device 320 to the client device 330 to alter user configurable settings on that device 330.

The user interface device 320 of FIG. 3 is configured in a different way than the user interface device 220 of FIG. 2. As before, the user interface device 320 includes a communication interface 340. However, in the embodiment shown in FIG. 3, the inputs 336 and outputs 338 are external to the user interface device 320. Input signals 348 corresponding to user input are transmitted from one or more input devices 336 to the user interface device 320. Output signals 349 may be transmitted from the user interface device 320 to one or more output devices 338.

In the illustrated embodiment, the input 336 could be, for example, a peripheral keyboard and a mouse, which are physically separate from the user interface device 320. The output 338 could be, for example, an analog or digital television monitor. Thus, the user interface 332 could include programming code for transmitting analog or digital television signals to the coupled television monitor.

The embodiment shown in FIG. 3 may be configured in a number of different ways within the scope of the disclosed systems and methods. In one embodiment, inputs 336 may be integrated with the user interface device 320, such as a notebook computer, while outputs 338 (e.g., a connected speaker) could be external to the user interface device 320. Of course, the inputs 336 (e.g., a peripheral trackball) could also be external to the user interface device 320, while the outputs 338 (e.g., a display screen on a tablet PC) could be integrated with the device 320.

Figure 4:
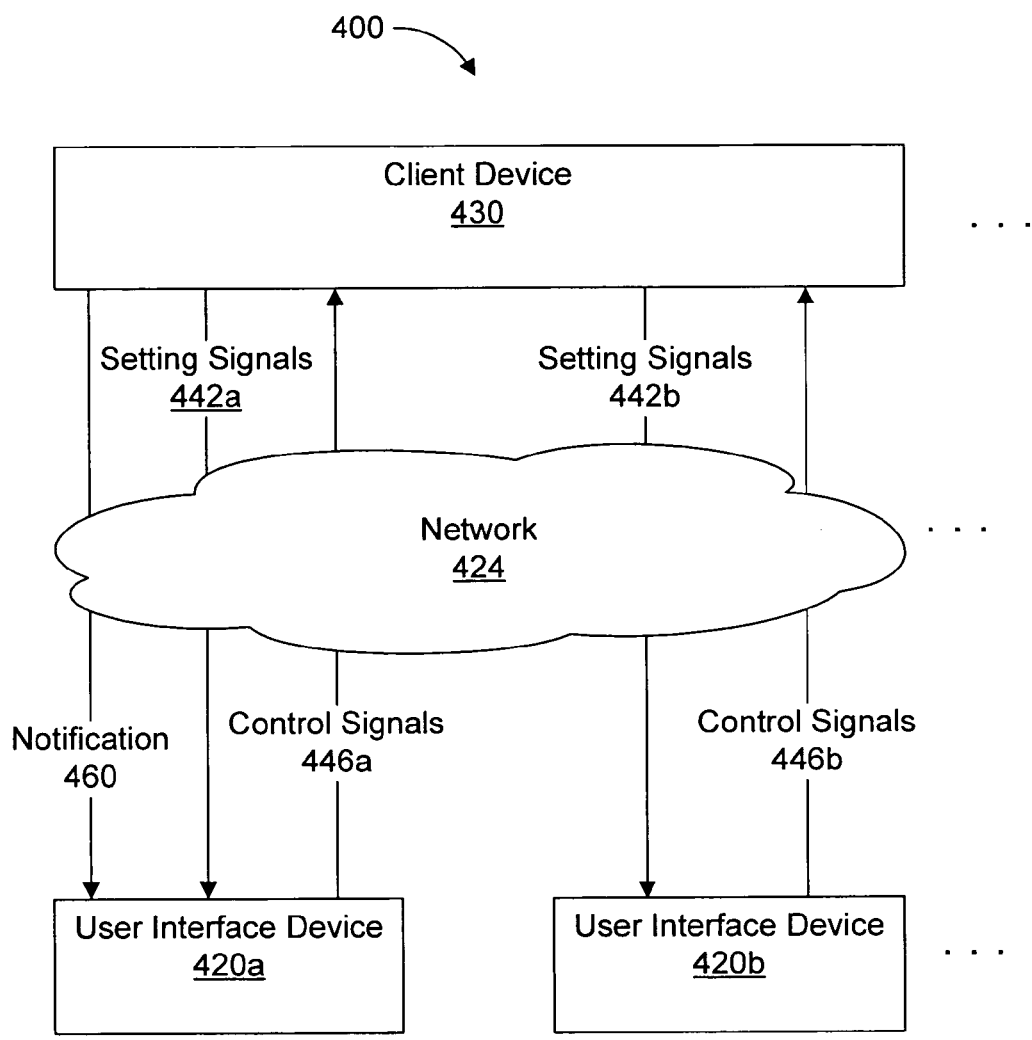
FIG. 4 is a block diagram of an alternative embodiment of a distributed user interface system including multiple user interface devices.

FIG. 4 is an alternative embodiment of a distributed user interface system 400. The depicted embodiment includes a first and a second user interface device 420a-b, a network 424, and a client device 430. As indicated in this figure, multiple user interface devices 420a-b may be used to interact with a single client device 430. In particular, setting signals 442a-b from the client device 430 may be transmitted to multiple user interface devices 420a-b. In turn, control signals 446a-b may be transmitted from each of the user interface devices 420a-b to alter the user configurable settings of the client device 430. Of course, different networks 424 may be utilized for communication between each of the distinct user interface devices 420a-b.

Utilizing two separate user interface devices 420a-b provides significant functional benefit to the disclosed systems and methods. For example, the first user interface device 420a could be a large wall-mounted touch screen. The large screen facilitates interaction and manipulation of the settings of the client device 430. However, the wall-mounted touch screen is not transportable. Accordingly, the second user interface device 420b could be, for example, a notebook computer having software and/or hardware to perform the distributed user interface functions. In an alternative embodiment, the second user interface device 420b could comprise a wireless phone and utilize a wireless phone network 424 to communicate with the client device 430. Accordingly, a user may remotely alter the user configurable settings of client device 430. For example, a user could access the lighting system 130m (shown in FIG. 1) to determine whether lights in the user's home were inadvertently left on. If one or more lights were left on, the user could initiate transmission of a control signal to turn the lights off, all from the user's office or any remote location.

Further, in one embodiment, the user interface device 420 may be utilized to receive notifications 460 from the client device 430. These notifications could include, for example, notice that an error has occurred in the client device 430a, that an alarm has been triggered, or that the device 430 needs maintenance.

The system 400 disclosed in FIG. 4 may be implemented in a number of different ways. For example, more than two user interface devices 420a-b could be utilized. Furthermore, multiple networks 424 and many different types of client devices 430, such as those shown in FIG. 1, could be utilized within the scope of the disclosed system 400.

Figure 5:
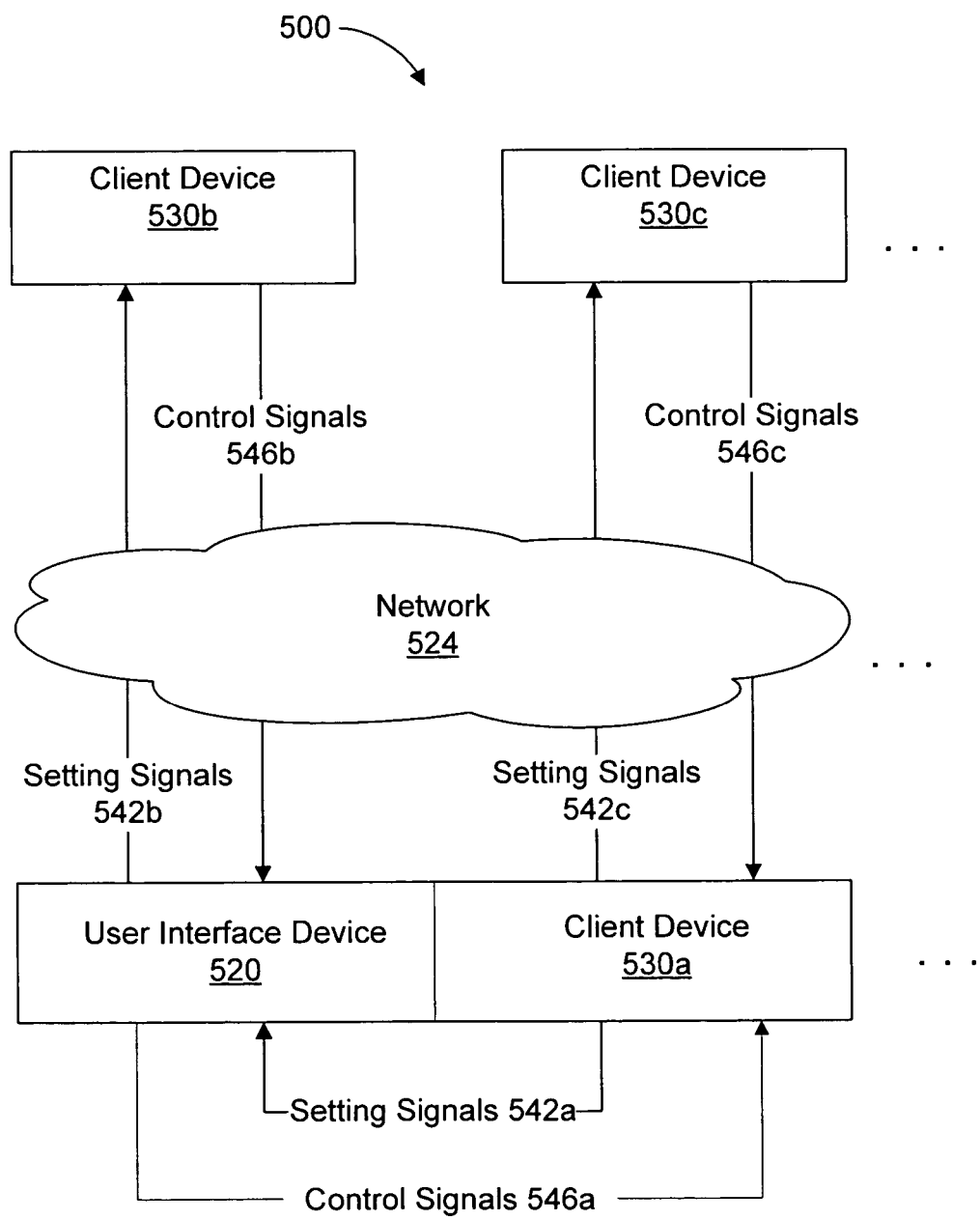
FIG. 5 is a block diagram of an alternative embodiment of a distributed user interface system including multiple client devices.

FIG. 5 is an alternative embodiment of a distributed user interface system 500. In FIG. 5, the illustrated system 500 includes an integrated user interface device/client device 520/530a, a network 524, and a second and a third client device 430b-c.

An integrated user interface device/client device 520/530a may be embodied in various ways. One example of this type of device 520/530a could be a refrigerator with a touch screen built into the exterior portion of the door. The touch screen could be utilized to view and alter the user configurable settings of the refrigerator, and, in this embodiment, could be coupled to the network 524 for manipulation and viewing of user configurable settings for other client devices 530b-c.

In one embodiment, setting signals 542a are transmitted from the client device 530a to the integrated user interface device 520/530a. In an alternative embodiment, setting signals 542a for the integrated client device 530a are permanently stored on the user interface device 520. Of course, even in such an embodiment, setting signals 542a may be transmitted to the integrated user interface device 520 to indicate current settings of the client device 530a. In response to the receipt of input signals corresponding to user input, control signals 546a-c are transmitted to pertinent client devices 530 to alter relevant user configurable settings.

As indicated in FIG. 5, a single user interface device 520 can be used to view and control settings for multiple client devices 530a-c. The single user interface device 520 can provide unified and familiar menus and controls (or consistent voice commands) to enable easy manipulation and viewing of user configurable settings for multiple client devices 530. Accordingly, a user may more easily interact with many client devices 530 without having to learn a new user interface for each of the multiple devices in the user's home or office.

The embodiment shown in FIG. 5 is merely illustrative. One alternative embodiment may, for example, include multiple user interface devices 520 together with multiple client devices 530. The number and type of user interface devices 520 and client devices 530 may be varied within the scope of the disclosed systems and methods.

Figure 6:
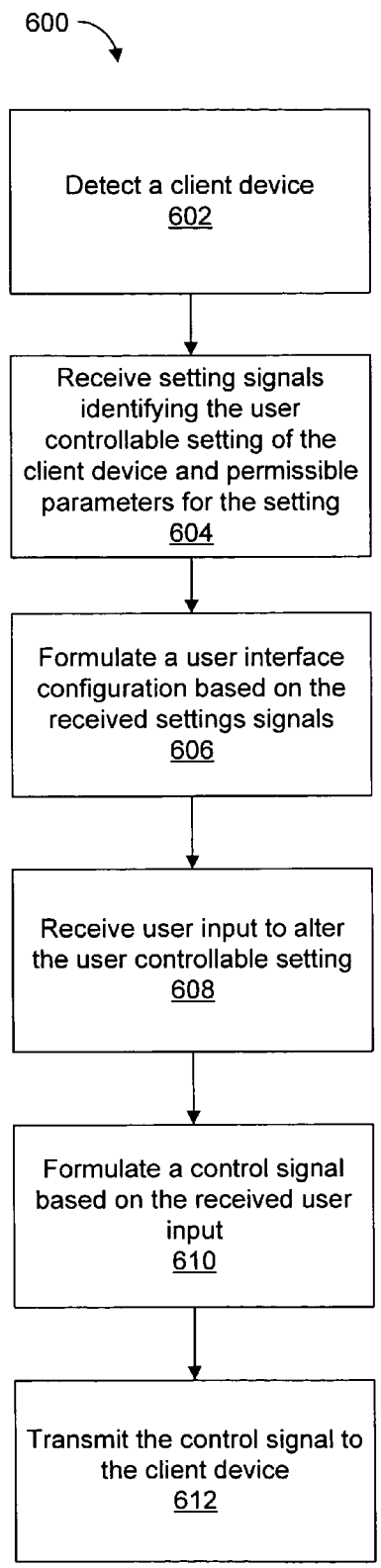
FIG. 6 is a block diagram illustrating one embodiment of a method for providing a distributed user interface for configuring a client device.

FIG. 6 is a flow diagram that illustrates one embodiment of a method 600 for a distributed user interface set up and configuration of client devices 530. Initially, a client device is detected 602 via an electronic communication channel, such as the network elects. In one embodiment, standard detection protocols may be utilized to enable rapid recognition of client devices placed in communication with a user interface device. Detection may be automatic, in one configuration, with no user intervention required (beyond placing the new client device and the user interface device in electronic communication with each other, e.g., via a wireless network). In one embodiment, a client device is self-describing such that a user interface device may more easily present an appropriate user interface.

Setting signals are received 604 at the user interface device. The setting signals identify the user controllable settings of the client device and permissible parameters for those settings. In one embodiment, the setting signals may further include current settings of the client device 530.

A user interface is formulated 606 based on the received setting signals 542 at the user interface device. Configuration of the user interface is controlled by the user interface device. In one embodiment, the setting signals 542 are devoid of any data identifying a particular configuration of user interface corresponding to the user configurable settings. As indicated above, the user interface device may be integrated with or physically discrete from inputs and outputs. The user interface may comprise, for example, programming codes for a graphical or other visual user interface or for receiving and processing voice commands.

In one embodiment, user input is received 608 at the user interface device via, for example, an input or an output device 336, 338. A control signal 546 is formulated 610 based on the received user input. The formulated control signal is then transmitted 612 to the client device to alter a user configurable setting of the pertinent client device. In response to receipt thereof, a user configurable setting is changed in the client device.

The foregoing method 600 may be implemented in connection with a wide variety of different configurations. For example, a wide variety of different client devices may be utilized, such as the client devices 130 illustrated in FIG. 1. Input and output devices and a network communication device may be integrated with (as shown in FIG. 2) or physically discrete from the user interface device (as shown in FIG. 3). Multiple user interface devices may be used to interact with a single client device, as shown in FIG. 4. A user interface device may be integrated with a client device or may be utilized to interact with multiple client devices, as shown in FIG. 5. In one embodiment, multiple client devices and multiple user interface devices are utilized.

The disclosed systems and methods provide substantial advantages over prior systems and methods. In particular, the following advantages may be realized by implementation of the disclosed systems and methods:

Distributed Architecture (or Separation of Specialization): Each client device can focus on its unique area of specialization. A user interface device is responsible for interacting with the user and the client device performs a specialized function, such that a particular client device does not become cluttered or unwieldy by an elaborate or oversized user interface.

Self-Describing Configuration: Configuration parameters are described, in one embodiment, by a client device in a way that the user interface device can dynamically choose an appropriate user interface for the device. This also allows for more automation of configuration.

Consistent View of Devices: The user interface device can present, in one configuration, a consistent user interface for numerous client devices, making interaction with client devices more uniform and intuitive. Accordingly, the learning curve for interacting with a new client device or multiple client devices is significantly diminished.

Customized View of Devices: A user may customize the type of user interface provided. For example, a user interface that includes audible or tactile output and unique input (e.g., voice commands) may be utilized by a disabled person.

Discovery: A user interface device can discover devices in need of configuration rapidly and in a standardized way.

Larger User Interface: A large, intuitive display screen for interacting with a client device may be utilized with a device that normally has only a small, cumbersome or even nonexistent user interface.

New, Smaller Client Devices: Use of the disclosed systems and methods may enable production of smaller client devices that include only a minimal or nonexistent user interface, decreasing the cost of such devices. Furthermore, because a user interface device may provide an elaborate user interface, compact client devices may include features and functionality that could not be utilized in prior client devices.

Configuration of Multiple Devices: A user interface device may be used to simultaneously configure or set up multiple identical or similar client devices.

Implemented with Pre-existing Products: A user interface device may be implemented with the pre-existing product already in a consumer's home or office. For example, the user interface device could comprise a personal computer having software/hardware to perform user interface functions.

Figure 7:
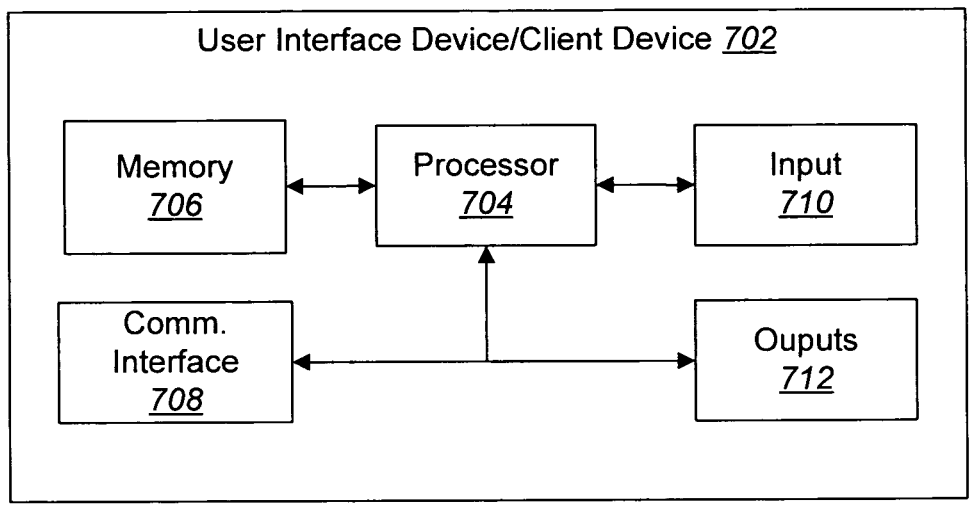
FIG. 7 is a block diagram illustrating the major hardware components typically utilized with embodiments of a user interface device or a client device.

FIG. 7 is a block diagram illustrating the major hardware components typically utilized with embodiments of a device 702, such as a user interface device or a client device. A device 702 typically includes a processor 704 in electronic communication with various components of the device 702. The processor 704 controls the operation of the device 702 and may be embodied as a microprocessor, a microcontroller, a digital signal processor (DSP), or other device known in the art. The processor 704 typically performs logical and arithmetic operations based on program instructions stored within the memory 706.

The processor 704 may also be in electronic communication with a communication interface 708. The communication interface 708 may be used for communications with external computing devices, servers, ambiance devices, ambiance device controllers, storage devices, etc. Thus, the communication interface 708 of the device 702 may be designed to send or receive signals from other devices. The communication interface 708 may be based on wired communication technology, wireless communication technology, or both. Examples of different types of communication interfaces 708 include a serial port, a parallel port, USB, an Ethernet adapter, an IEEE 1394 bus interface, a small computer system (SCSI) bus interface, an infrared (IrDA) communication port, a Bluetooth wireless communication adapter, and so forth.

The processor 704 may, in one embodiment, operably be connected to various input 710 and/or output 712 devices capable of electronic communication with the processor 704, or, in other words, with devices capable of input and/or output in the form of an electrical signal. Examples of different kinds of input devices 710 include a keypad, keyboard, mouse, microphone, remote control device, button, joystick, trackball, touchpad, touch screen, lightpen, etc. Examples of different kinds of output devices 710 include an LCD screen (for displaying the status of selected features of the device 702) and an audio speaker.

The device 702 may also include memory 706. The memory 706 may be a separate component from the processor 704, or it may be on-board memory 706 integrated with the processor 704. For example, microcontrollers often include a certain amount of on-board memory. As used herein, the term "memory" 706 is broadly defined as any electronic storage medium, such as read-only memory (ROM), random access memory (RAM), magnetic disk storage media, optical storage media, flash memory devices, on-board memory included with the processor 704, EPROM memory, EEPROM memory, registers, etc. The memory 706 typically stores program instructions and other types of data. The program instructions may be executed by the processor 704 to implement some or all of the methods disclosed herein. The memory 706 may also be used, for example, to store device style sheets.

In one embodiment, the device 702 is an embedded device. An embedded device stores much, if not all, of its programming code in read-only memory. An embedded device is not a general purpose computer, but generally performs a specific purpose, such as transmitting setting signals to user interface devices. In an alternative embodiment, the user interface device may comprise a desktop computer, server, notebook or laptop computer, tablet PC, personal data assistant (PDA) or other type of computing device, having suitable hardware and/or software for performing user interface functions.

Figure 8:
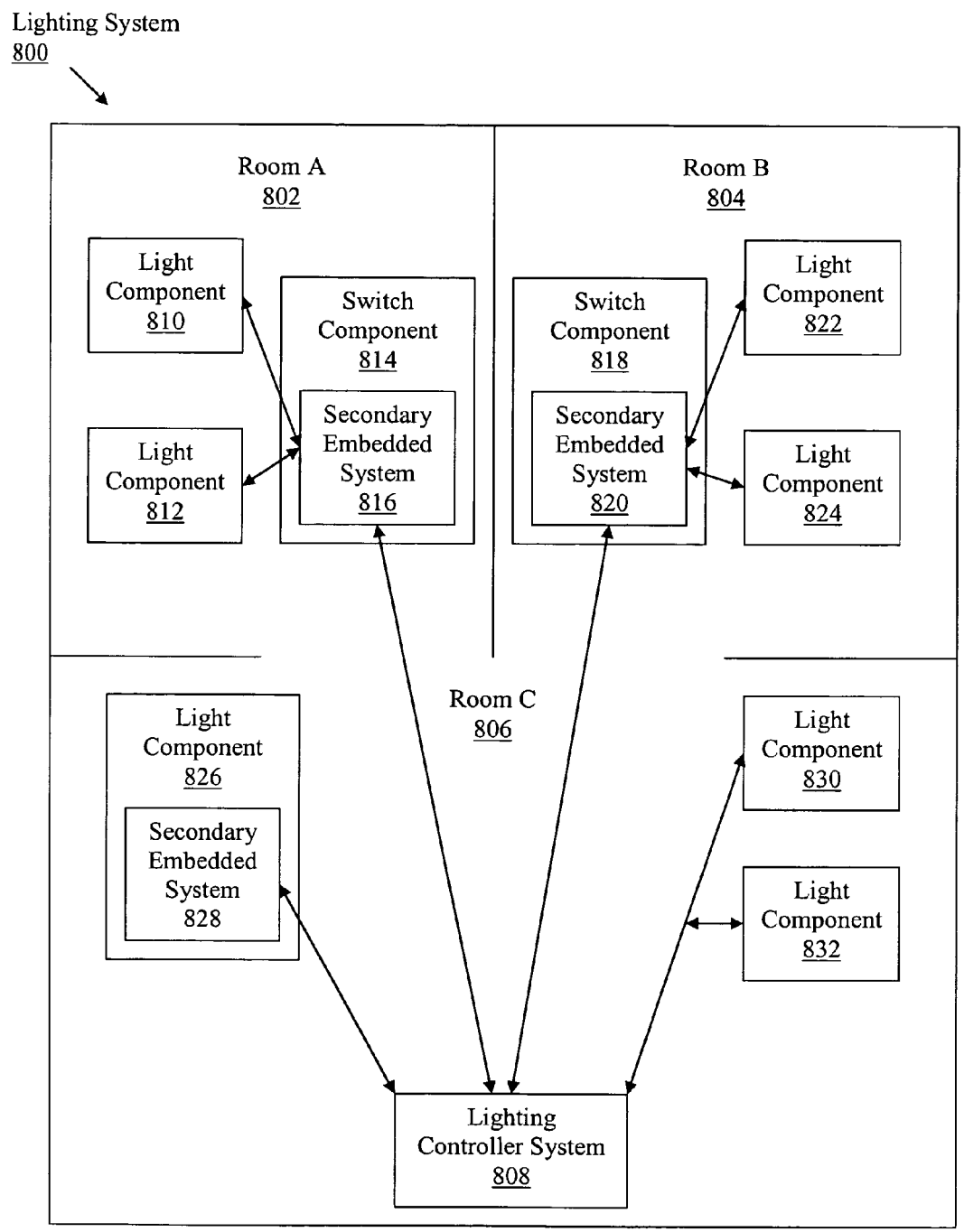
FIG. 8 is a block diagram illustrating a lighting system that may be utilized in connection with the disclosed systems and methods for providing a distributed user interface.
Figure 9:
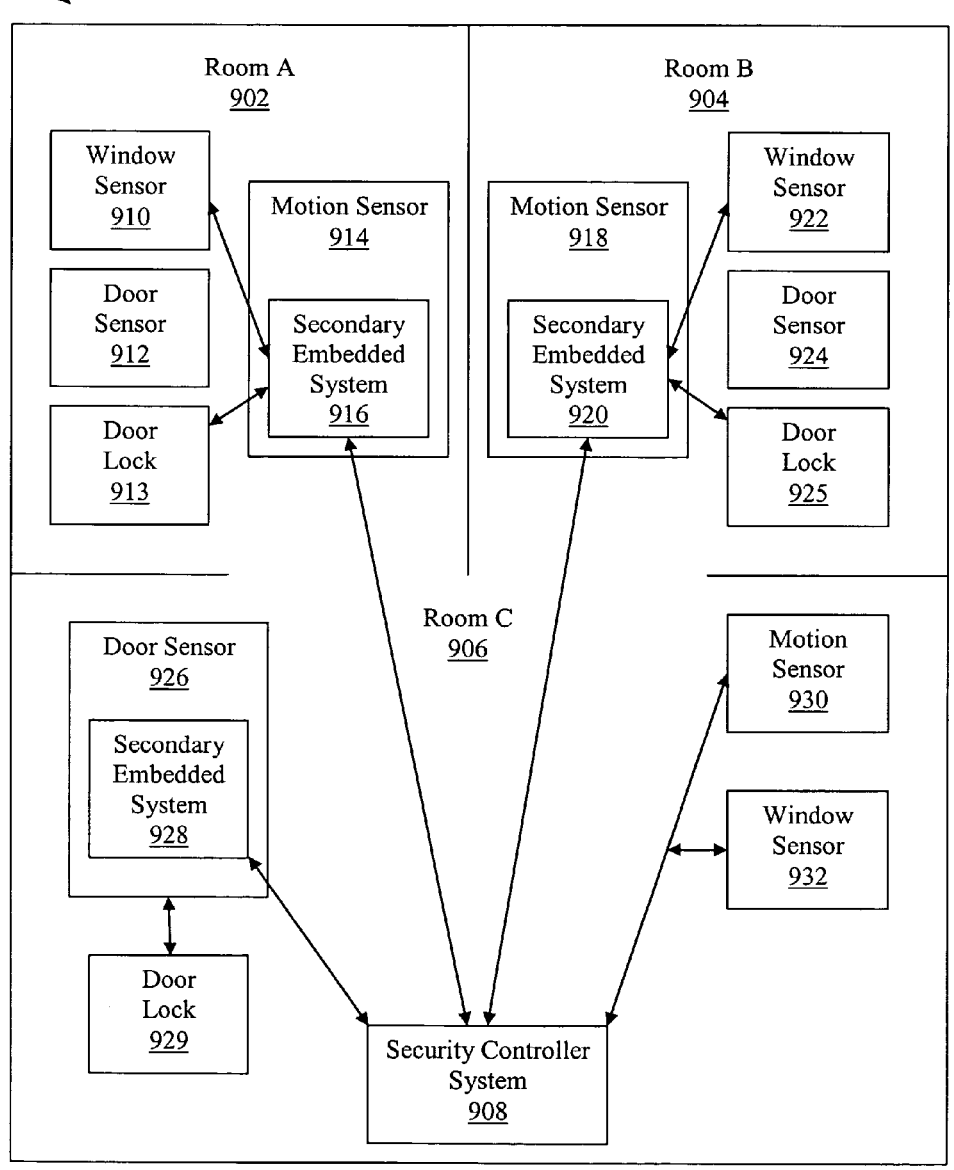
FIG. 9 is a block diagram illustrating a security system that may be utilized in connection with the disclosed systems and methods for providing a distributed user interface.
Figure 10:
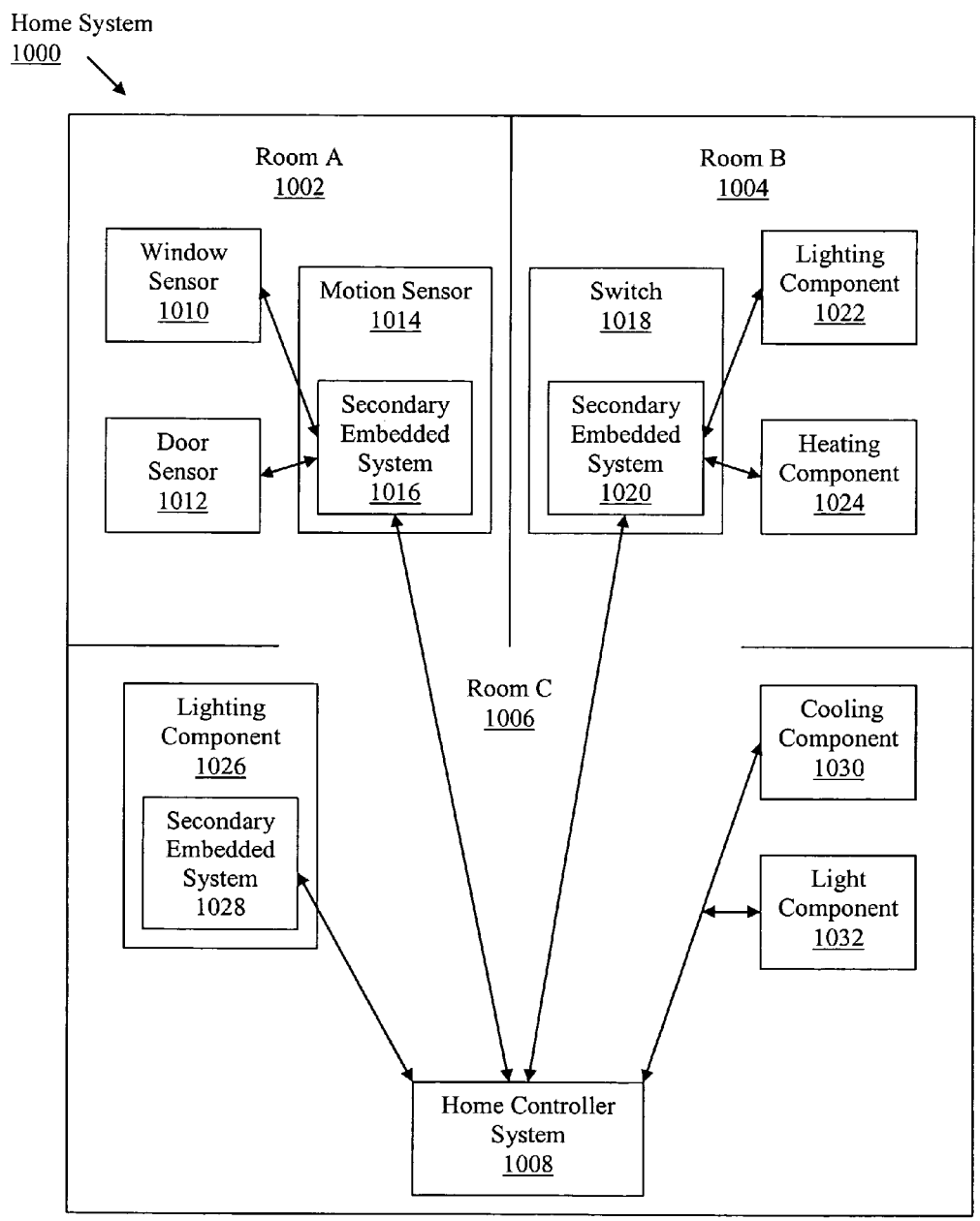
FIG. 10 is a block diagram illustrating a home system that may be utilized in connection with the disclosed systems and methods for providing a distributed user interface.

The present systems and methods may be used in several contexts. For example, distributed user interface systems 500 may be utilized in connection with various control systems, which are illustrated in FIGS. 8-10. The distributed user interface systems and control systems may utilize the same network and client devices.

FIG. 8 is a block diagram that illustrates one embodiment of a lighting system 800 that includes a lighting controller system 808. The lighting system 800 of FIG. 8 may be incorporated, for example, into various rooms within a home. As illustrated, the system 800 includes a room A 802, a room B 804, and a room C 806. This system 800 may be implemented in any number and variety of rooms within a home, dwelling, building, or other environment.

The lighting controller system 808 may monitor and control additional embedded systems and components within the system 800. In one embodiment, room A 802 and the room B 804 each include a switch component 814, 818. The switch components 814, 818 may also include a secondary embedded system 816, 820. The secondary embedded systems 816, 820 may receive instructions from the central lighting controller system 808. The secondary embedded systems 816, 820 may then execute these instructions. The instructions may include powering up or powering down various light components 810, 812, 822, and 824. The instructions may also include dimming or increasing the brightness of the various light components 810, 812, 822, and 824. The instructions may further include arranging the brightness of the light components 810, 812, 822, and 824 in various patterns. The secondary embedded systems 816, 820 may also facilitate monitoring and controlling each light component 810, 812, 822, and 824 through the central embedded system 808.

The lighting controller system 808 might also provide instructions directly to a light component 826 that includes a secondary embedded system 828 in room C 806. The central embedded system 808 may, for example, instruct the secondary embedded system 828 to power down or power up the individual light component 826. Similarly, the instructions received from the central embedded system 808 may include dimming or increasing the brightness of the individual light component 826. The lighting controller system 808 may also monitor and provide instructions directly to individual light components 830, 832 within the system 800.

FIG. 9 is a block diagram illustrating one embodiment of a security system 900. As with the lighting system, the security system 900, in the depicted embodiment, is implemented in a room A 902, a room B 904, and a room C 906. These rooms may be in the confines of a home or other enclosed environment. The system 900 may also be implemented in an unenclosed environment where the rooms A, B and C, 902, 904, 906 represent territories or boundaries.

The system 900 includes a security controller system 908. The security controller system 908 monitors and receives information from the various components within the system 900. For example, motion sensors 914, 918 in rooms A and B 902, 904 may each include a secondary embedded system 916, 920. The motion sensors 914, 918 may monitor an area for motion and alert the security controller system 908 when motion is detected via the secondary embedded systems 916, 920. The security controller system 908 may also provide instructions to the various components within the system 900.

For example, the security controller system 908 may provide instructions to the secondary embedded systems 916, 920 to power up or power down a window sensor 910, 922, a door sensor 912, 924, or door locks 913, 925. In one embodiment, the secondary embedded systems 916, 920 notify the security controller system 908 when the window sensors 910, 922 detect movement of a window. Similarly, the secondary embedded systems 916, 920 notify the security controller system 908 when the door sensors 912, 924 detect movement of a door.

The security controller system 908 may also monitor and provide instructions directly to individual components within the system 900. For example, the security controller system 908 may monitor and provide instructions to power up or power down a motion or window sensor 930, 932.

Each individual component comprising the system 900 may also include a secondary embedded system. For example, FIG. 9 illustrates a door sensor 926 including a secondary embedded system 928. An electronic door lock 929 is also shown. The security controller system 908 may monitor and provide instructions to the secondary embedded system 928 as similarly described above.

FIG. 10 is a block diagram illustrating one embodiment of a home system 1000. The home system 1000 includes a home controller system 1008 that facilitates the monitoring of various systems, such as the lighting system 800, the security system 900, and the like. The home system 1000 allows a user to control various components and systems through one or more embedded devices. In one embodiment, the home controller system 1008 monitors and provides information in the same manner as previously described in relation to FIGS. 8 and 9. In the depicted embodiment, the home controller system 1008 provides instructions to a heating component 1024 via a secondary embedded system 1020. The heating component 1024 may include a furnace or other heating device typically found in resident locations or offices. The home controller system 1008 may provide instructions to power up or power down the heating component 1024 via the secondary embedded system 1020.

Similarly, the home controller system 1008 may monitor and provide instructions directly to a component within the home system 1000, such as a cooling component 1030. The cooling component 1030 may include an air conditioner or other cooling device typically found in resident locations or offices. The home controller system 1008 may instruct the cooling component 1030 to power up or down depending on the temperature reading collected by the home controller system 1008. The home system 1000 functions in a similar manner as previously described in relation to FIGS. 8 and 9.

Of course, in one embodiment, a single user interface device (e.g., 520) could be used to interact with all of the exemplary systems 800, 900, 1000 shown in FIGS. 8-10, and other types of systems not shown. Alternatively, each system 800, 900, 1000 could include one or more separate user interface devices (e.g., 520).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing a distributed user interface for configuration of a client device comprising:
    detecting, from a user interface device, a client device having at least one user configurable setting;
    receiving, at the user interface device, setting signals identifying the user configurable setting of the client device and permissible parameters for the user configurable setting, wherein the setting signals are devoid of any data identifying a particular configuration of how the user configurable setting is to be graphically represented in a user interface and wherein the setting signals do not specify a configuration of how the user configurable setting is to be graphically represented;
    formulating, on the user interface device, a user interface for the client device based on the received setting signals, wherein formulating comprises determining how to represent the user configurable setting graphically and then creating a graphical representation of the user configurable setting based upon the determination, and wherein the graphical representation of the user configurable setting is determined by the user interface device rather than the client device and wherein determining how to represent the user configurable setting graphically comprises selecting whether to represent the user configurable setting as a check box, a drop down menu, a data entry box, a point-and-click button, a nested menu, a slide controller, or a dial; and
    displaying the user interface on a display screen that is external to the user interface device.

2. The method of claim 1, wherein the setting signals further identify current settings of the client device.

3. The method of claim 2, further comprising transmitting a notification from the client device to the user interface device.

4. The method of claim 3, wherein the client device is an embedded device.

5. The method of claim 4, further comprising:
    receiving input signals corresponding to user input at the user interface device to alter the user configurable setting;
    formulating a control signal at the user interface device based on the received input signals; and
    transmitting the control signal from the user interface device to the client device.

6. The method of claim 5, further comprising:
    detecting from the user interface device a second client device having at least one user configurable setting; and
    receiving, at the user interface device, setting signals from the second client device.

7. The method of claim 1, wherein the user interface device is an embedded device.

8. The method of claim 4, wherein the user interface is consistent for multiple client devices.

9. The method of claim 8, further comprising configuring multiple similar client devices simultaneously on the user interface device.

10. The method of claim 8, wherein formulating the user interface further comprises an audible user interface.

11. The method of claim 10, wherein the setting signals further comprise a name, a type, and a size of data provided without identifying a graphical representation of the user configurable setting in the user interface.

12. The method of claim 6, wherein the client device comprises a furnace, a portable personal health monitor, a refrigerator or an oven.

13. A system that is configured to provide a distributed user interface for configuration of a client device, the system comprising:
    a user interface device having a processor and memory, the processor and memory being in electronic communication with each other;
    a client device having at least one user configurable setting, the client device being in electronic communication with the user interface device;
    instructions stored in the memory, the instructions being executable to:

detect, from the user interface device, the client device;
receive, at the user interface device, setting signals identifying the user configurable setting of the client device and permissible parameters for the user configurable setting, wherein the setting signals are devoid of any data identifying a particular configuration of how the user configurable setting is to be graphically represented in a user interface and wherein the setting signals do not specify a configuration of how the user configurable setting is to be graphically represented;
formulate, on the user interface device, a user interface for the client device based on the received setting signals, wherein formulating comprises determining how to represent the user configurable setting graphically and then creating a graphical representation of the user configurable setting based upon the determination, and wherein the graphical representation of the user configurable setting is determined by the user interface device rather than the client device and wherein determining how to represent the user configurable setting graphically comprises selecting whether to represent the user configurable setting as a check box, a drop down menu, a data entry box, a point-and-click button, a nested menu, a slide controller, or a dial; and
display the user interface on a display screen that is external to the user interface device.

14. The system of claim 13, wherein the setting signals further identify current settings of the client device.

15. The system of claim 13, wherein the instructions are further executable to transmit a notification from the client device to the user interface device.

16. The system of claim 13, wherein the instructions are further executable to:
receive input signals corresponding to user input at the user interface device to alter the user configurable setting;
formulate a control signal at the user interface device based on the received input signals; and
transmit the control signal from the user interface device to the client device.

17. The system of claim 13, wherein the instructions are further executable to:
detect from the user interface device a second client device having at least one user configurable setting; and
receive, at the user interface device, setting signals from the second client device.

18. A non-transitory computer-readable medium comprising memory having executable instructions stored therein for providing a distributed user interface for configuration of a client device, the instructions being executable to:
detect, from a user interface device, a client device having at least one user configurable setting;
receive, at the user interface device, setting signals identifying the user configurable setting of the client device and permissible parameters for the user configurable setting, wherein the setting signals are devoid of any data identifying a particular configuration of how the user configurable setting is to be graphically represented in a user interface and wherein the setting signals do not specify a configuration of how the user configurable setting is to be graphically represented;
formulate, on the user interface device, a user interface for the client device based on the received setting signals, wherein formulating comprises determining how to represent the user configurable setting graphically and then creating a graphical representation of the user configurable setting based upon the determination, and wherein the graphical representation of the user configurable setting is determined by the user interface device rather than the client device and wherein determining how to represent the user configurable setting graphically comprises selecting whether to represent the user configurable setting as a check box, a drop down menu, a data entry box, a point-and-click button, a nested menu, a slide controller, or a dial; and
display the user interface on a display screen that is external to the user interface device.

19. The computer-readable medium of claim 18, wherein the instructions are further executable to transmit a notification from the client device to the user interface device.

20. The computer-readable medium of claim 18, wherein the instructions are further executable to:
receive input signals corresponding to user input at the user interface device to alter the user configurable setting;
formulate a control signal at the user interface device based on the received input signals; and
transmit the control signal from the user interface device to the client device.

21. The computer-readable medium of claim 18, wherein the instructions are further executable to:
detect from the user interface device a second client device having at least one user configurable setting; and
receive, at the user interface device, setting signals from the second client device.

22. The computer-readable medium of claim 18, wherein the setting signals further identify current settings of the client device.

\* \* \* \* \*

UNITED STATES PATENT AND TRADEMARK OFFICE
CERTIFICATE OF CORRECTION

Page 1 of 1

PATENT NO.        : 8,806,347 B2
APPLICATION NO.   : 11/320554
DATED             : August 12, 2014
INVENTOR(S)       : James L. Simister It is certified that error appears in the above-identified patent and that said Letters Patent is hereby corrected as shown below:

IN THE SPECIFICATION:

In column 5, line 9, please delete "garage 100*a*" and replace it with --garage 110*a*--.

Signed and Sealed this
Third Day of February, 2015

Michelle K. Lee
*Deputy Director of the United States Patent and Trademark Office*